Aug. 27, 1946.    L. SPRARAGEN    2,406,644
REVERSIBLE RELEASABLE CLUTCH
Filed June 14, 1943

INVENTOR
Louis Spraragen,
BY
Johnson and Kline
ATTORNEYS

Patented Aug. 27, 1946

2,406,644

UNITED STATES PATENT OFFICE 2,406,644

REVERSIBLE RELEASABLE CLUTCH

Louis Spraragen, Bridgeport, Conn., assignor to Automatic Locking Devices Incorporated, Bridgeport, Conn., a corporation of Connecticut Application June 14, 1943, Serial No. 490,768

18 Claims. (Cl. 192—17)

This invention relates to machine elements, and more particularly to a clutch or coupling device for releasably connecting a power shaft, for instance a shaft of an electric motor or other prime mover, and a driven shaft adapted to perform work.

An object of the present invention is to provide an automatic clutch in which the driving and driven shafts are normally coupled or clutched together for rotation and in which the shafts are uncoupled by applying stopping or braking force to a controller rotatable with the driven member and which is so arranged that when the stopping or braking force is removed the clutch again becomes operative to transmit power from the driving to the driven shafts.

This is accomplished, according to the present invention, by providing a driving member in the form of a circular housing adapted to be connected to a driving shaft, a driven member within the housing and adapted to be connected to the driven shaft, and interponents between the two in the form of rollers adapted to wedge between converging surfaces on the driving and driven members to couple these together for movement as one or to float freely in the space between the driving and driven members when the clutch is uncoupled, and a control member rotating with the driven member and having movement relative thereto for moving the interponents from wedging or driving position as a result of said relative movement between itself and the driven member.

In the broader aspects of this invention, any suitable means may be employed for applying braking or stopping force to the control member to uncouple the driving and driven members depending upon the circumstances and conditions of the use of the clutch.

In one form of the invention, the control member may be stopped positively causing the clutch to disengage. In another form, frictional braking power may be applied to the control member to retard it and thus cause sufficient relative movement between the control member and the driven member, and if desired this braking action may be transmitted to the driven member through the control member to gradually bring the driven member to a stop. This latter form of the invention may be further modified by providing a brake drum on the control member so that the latter may be brought to a stop by means of a brake band and operating lever.

In the preferred form of this invention, the driving and driven members and the interponents between them, as well as the control member, are so arranged that the power may be transmitted and controlled through the clutch in either direction of rotation of the driving shaft, there being one set of interponents for driving in a clockwise direction and another set of interponents for driving in a counterclockwise direction, there preferably being a spring between the two interponents so as to normally urge both of them to driving position. In this situation the control member is provided with double operating means, one for each direction of rotation.

In the broader aspects of the invention, the driven shaft may be brought to a stop through braking action produced between the control member, the interponents and the driven member, or it may be applied to the driven member directly through the control member. For this purpose, the control member and the driven member may have cooperating parts adapted to engage when the control member has had limited movement (in either direction if the device is reversible) relative to the driven member. Further, when the driven member is under a load which is greater than the momentum of its parts so that it stops as soon as the driving force is removed, no braking action between the control member and the driven member is needed. Such a situation occurs in the drive between treads of a military tank and the engine for driving them, and in such a situation there would be no tendency for the driven member to overrun the driving member when these members are uncoupled.

Other features and advantages will hereinafter appear.

In the accompanying drawing which illustrates several embodiments of this invention—

Figure 1:
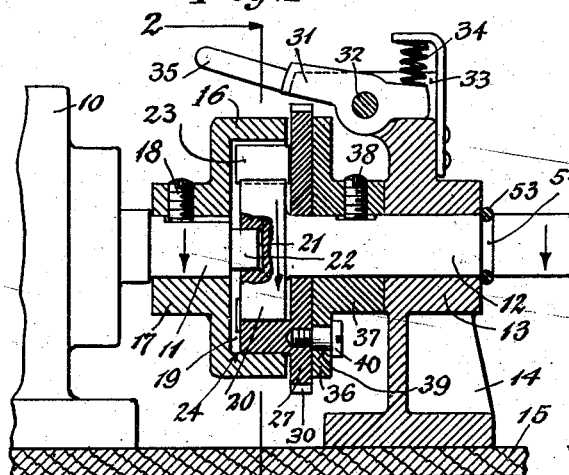
Figure 1 is a longitudinal sectional view showing one form of this invention.

As shown in the accompanying drawing, the reversible coupling device of this invention is adapted to be interposed between a driving member, such as an electric motor 10 or other prime mover for drive shaft 11, and a driven or work-producing shaft 12, the latter when necessary being provided with a bearing 13 in a bracket 14. This may be mounted on a common support 15 with the motor 10 or other bearing member for the drive shaft 11. The driven shaft 12 may extend to or may be connected to operate any suitable device or mechanism.

In its broader aspects, the device of the present invention may conveniently be employed to uncouple or temporarily disconnect the driving shaft and the driven shaft in power trains so that the driven shaft may stop or naturally come to rest as it will if the load on the driven shaft exceeds the momentum of the parts driven thereby.

In other situations, it is frequently desired that the driven shaft be forcibly stopped without stopping the motor or drive shaft, and yet be able merely by removing the stopping force or member to permit the drive to be resumed. Stated otherwise, it is frequently desired to declutch and stop with a single operation and reclutch and drive with the reverse of the operation.

The present invention provides a simple and expeditious structure for declutching and clutching the drive and driven shafts and which depends for its operativeness and inoperativeness upon a control member which rotates with the driven member and which is so organized that when it is free the drive shaft and the driven shaft are clutched together, but when it is stopped the shafts are declutched and if desired braking or stopping force is applied to the driven member to stop it. The device of the present invention is so organized that it is operative both when the drive shaft is rotated clockwise and counterclockwise, and is therefore reversible. Yet, regardless of the direction in which the shafts are turning, the stopping or retarding of the control member, as by means of a manually or mechanically operated stopping lever or brake, causes the driven shaft to be unclutched and also stopped if desired.

Figure 4:
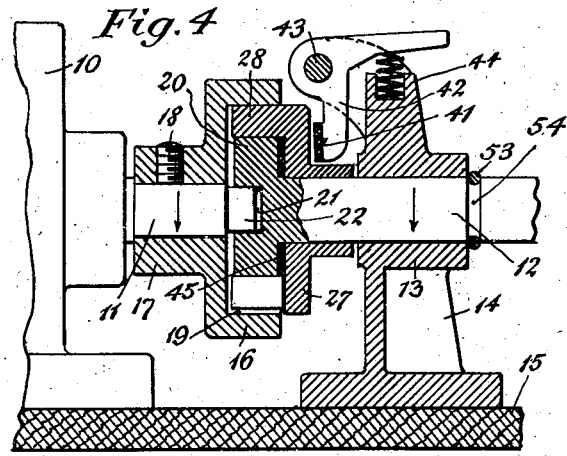
Fig. 4 is a view similar to Fig. 1, but showing a modification of this invention in which the control member and the driving member if desired are uncoupled and stopped by the application of friction.

In the form of the invention herein disclosed, the clutch comprises a rotary member 16 having a collar 17 fitting over the drive shaft 11 and a set screw 18 or other connection to the shaft. The rotary member 16 has a cavity or chamber 19 within which is housed a driven member 20 forming part of or secured to the driven shaft 12. Shafts 11 and 12 are mounted so as to be coaxial and this concentricity may be obtained and maintained by providing a socket 21 in the driven member to receive the end 22 of the drive shaft 11, as shown in Fig. 4.

Figure 2:
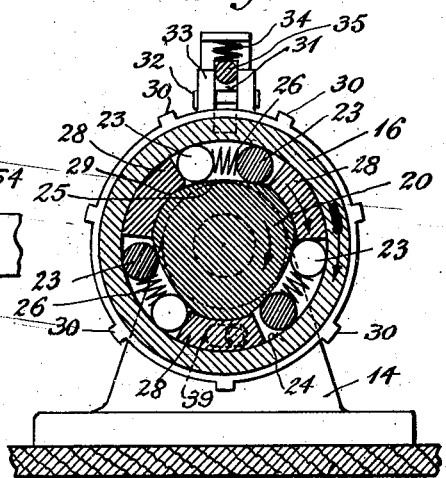
Fig. 2 is a vertical transverse sectional view on line 2—2 of Fig. 1, showing the relation of the driving and driven members, the interponents and the control member, the parts being in position for driving in a clockwise direction.
Figure 3:
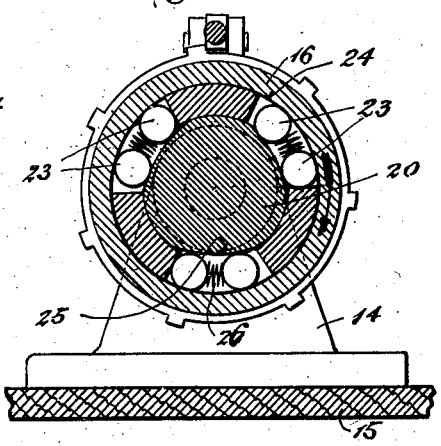
Fig. 3 is a view similar to Fig. 2, but showing the driven shaft uncoupled from the driving shaft.

The driven member 20 is smaller than the cavity of the driving member 16, and in the space between the two there are provided pairs of interponents in the form of rollers 23, see Figs. 2 and 3. The rollers 23 may ride on the internal wall 24 of the driving member 16 which is concentric with the shafts. Normally, however, due to camming or wedging surfaces 25 on the driven member 20 and a spring 26 between the rollers of each pair, the rollers are wedged between the concentric surface 24 of the driving member and the cam surfaces 25 of the driven member, and this wedging action locks the driving member 16 and driven member 20 together for movement both clockwise and counterclockwise as viewed in Fig. 2. There may be a single set of rollers 23 or a plurality of sets as shown, depending upon the load to be carried and the extent to which the load may be safely distributed between the roller surfaces.

In order to uncouple or declutch the driving member 16 from the driven member 20, the present invention provides a controller 27 having lugs 28 extending into the space between the circular internal race 24 of the driving member and circular sections 29 on the driven member. The controlling member 27 is rotatably mounted on the driven shaft 12 and rotates with the latter due to friction or drag between it and the driven shaft, yet it is free to be moved relative to the driven shaft by the pressure of the springs 26 transmitted through the rollers 23 to the ends of the lugs.

When the drive shaft 11 is stationary, a balanced condition will exist due to the power of the springs 26 so that both rollers 23 of each pair are in wedging condition. When, however, the drive shaft 11 begins to turn, say for instance clockwise as shown in Fig. 2, the leading roller being bound between the drive and driven members, causes the driven member to rotate while the following roller becomes overrunning and simply rotates idly down the incline or cam 25, being assisted in this operation if necessary by being engaged by the end of the lug 28, the trailing end of the next advanced lug having moved away from the leading roller 23. The driving member 16 and driven member 20 being thus coupled together continue to rotate with the controlling member 27 being dragged along.

When it is desired to declutch the driven member from the driving member, it is merely necessary to retard the advancing movement of the control member 27 causing the trailing edge of each lug 28 to strike the driving roller 23 and move it down the incline, and thus become operatively disengaged from the race 24 of the driving member. When, as in many cases occurs, the load on the driven shaft 12 exceeds the momentum of the parts, the disconnection of the driven member from the driving member will cause the former to naturally stop. However, this condition does not always prevail, and when it is desired not only to declutch the driven member but to stop it, some means acting through the intermediary of the control member may be employed to stop or retard and then stop the driven member.

In the broader aspects of this invention, the control member 27 may be retarded or stopped in any suitable manner depending upon its speed, the power being transmitted, and the inertia of the parts. For instance, in a light mechanism, it is merely necessary to apply one's finger to the control member 27 to retard it sufficiently to uncouple the driving and driven members and then to stop it if desired. However, mechanical means may be employed to retard or stop the control member and the driven member if desired. In the form of the invention shown in Fig. 1, the means provided not only positively stops the control member but through the latter stops the driven shaft immediately upon the stop being made operative.

For this purpose, the control member is provided with a series of stop lugs 30 on its periphery and these are adapted to be engaged by a stop dog 31 pivoted at 32 on an extension 33 of the bracket 14, and normally held elevated, in this particular case, by a spring 34. When it is desired to declutch the shaft 12, fingerpiece 35 or other operating connection to the dog 31 is depressed moving the dog into the path of the lugs 30 and abruptly stopping the control member to uncouple the shaft 12 from the shaft 11. Where it is desired to also positively stop the driven shaft, a lost motion connection may be provided between the control member and the driven shaft. For this purpose, as shown in Fig. 1, a disk 36 mounted on a collar 37 is secured to the drive shaft 12 by a set screw 38, and this has a slot 39 indicated in dotted lines in Fig. 2, through which a screw 40 threaded in the control member extends. When the screw 40 reaches the end of the slot 39, the stopping or braking action applied to the control member is also transmitted to the disk 36 and the driven shaft to stop the latter. The length of the slot 39 is such as to permit the amount of relative movement between the driven member and the control member necessary to permit the lugs 28 on the control member to move beyond the advanced rollers 23 both for forward and backward rotation.

So long as the dog 31 is in engagement with the stop lugs 30 on the controller, the driving connection between the driving shaft 11 and driven shaft 12 is interrupted. However, as soon as the dog 31 is disengaged from the controller, the springs 26 acting on the rollers 23 shift the latter to driving position and in doing so move the controller ahead so that the advanced roller may jam between the race 24 of the driving member and the cam surface 25 of the driven member.

As stated above, the controlling member 27 may be retarded by application of friction. In the form of the invention shown in Fig. 4, this is accomplished by applying a friction brake 41 carried by a brake arm 42 pivoted at 43 on an extension 44 of the bracket 14 to the side of the control member, and this produces the relative movement necessary to uncouple the driving and driven members.

Figure 5:
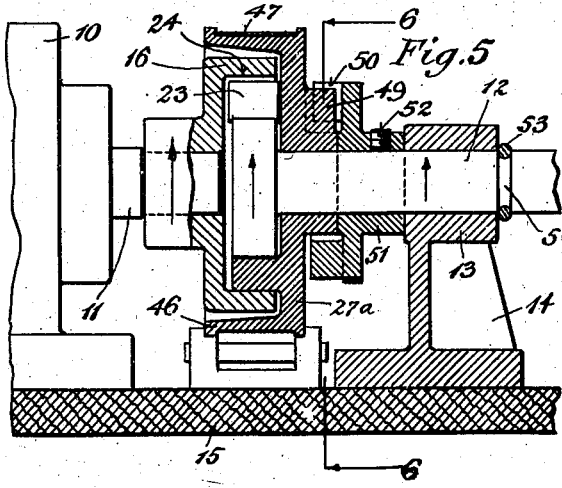
Fig. 5 is a view similar to Figs. 1 and 4, but showing a further modification of this invention in which the controlling member has a brake drum controlled by a brake band and also has a mechanically limited movement relative to the driven shaft so that the latter may be gradually brought to a stop by friction applied to the brake drum.
Figure 6:
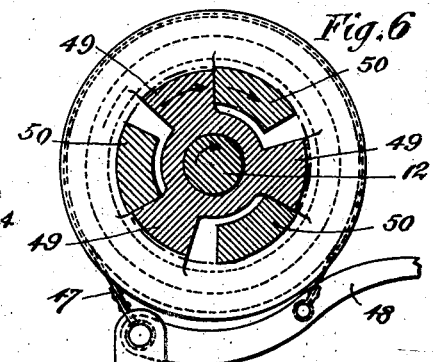
Fig. 6 is a transverse section on line 6—6 of Fig. 5.

If desired, the application of friction to the controller may also retard the driven shaft 12, and for this purpose friction-producing surfaces 45 may be provided on the face of the driven member 20 or the adjacent face of the controller 27 or both. When the brake 41 is applied in this case it will not only retard the controller but also press the controller against the driven member and through the controller retard the driven member.

Where the inertia of the parts is particularly great, the controller may be retarded and then stopped and may act mechanically to retard and stop the driven shaft. Such an arrangement is shown in Fig. 5 in which the controller 27a has a brake drum 46 adapted to be engaged by a brake band 47 made operative by operation of a lever 48. The brake drum 46 may extend over the driven member 16 so as to house the latter within itself and thus make a very compact construction. In this form of the invention, the controller is provided with lugs 49 adapted to be engaged by lugs 50 on a collar 51 secured to the driven shaft 12 by a set screw 52 or other suitable means. Thus, when the brake drum 46 on the controlling member 27a is retarded, the rollers 23 are made inoperative, then the lugs 49 engage the lugs 50 and friction applied to the brake drum, thus gradually bringing the driven shaft 12 to a stop.

The driven shaft may be held against movement relative to the bracket by any suitable means such, for instance, as by a spring ring 53 fitting in a groove 54 in the shaft 12.

Variations and modifications may be made within the scope of this invention and portions of the improvements may be used without others.

I claim:

1. A clutch having a driving member and a driven member, interponents floatingly carried between them, resilient means for moving said interponents to position to become wedged between the driving and driven members and simultaneously couple them for movement as one in either direction, a control member rotatable with the driven member for moving said interponents to inoperative position against the force of said resilient means to uncouple said members for independent rotation of the driving member; and means for causing relative movement of the control member and the driven member for rendering said interponents inoperative and uncoupling the driving and driven members.

2. A clutch having a driving member and a driven member, interponents floatingly carried between them, resilient means for moving said interponents to position to become wedged between the driving and driven members and simultaneously couple them for movement as one in either direction, a control member rotatable with the driven member for moving said interponents to inoperative position against the force of said resilient means to uncouple said members for independent rotation of the driving member; and means for applying braking force to said control member to cause it to move relative to said driven member and render the interponents inoperative so as to uncouple the driving and driven members.

3. A clutch having a driving member and a driven member, interponents floatingly carried between them, resilient means for moving said interponents to position to become wedged between the driving and driven members and couple them for movement as one, a control member rotatable with the driven member for moving said interponents to inoperative position against the force of said resilient means to uncouple said members for independent rotation of the driving member; means for applying braking force to said control member to cause it to move relative to said driven member and render the interponents inoperative and uncouple the driving and driven members; and a lost-motion device between the control member and the driven member whereby the braking action applied to the control member is applied to the driven member after said interponents have been rendered inoperative to stop rotation of the driven member.

4. A clutch having a driving member and a driven member, interponents floatingly carried between them, resilient means for moving said interponents to position to become wedged between the driving and driven members and simultaneously couple them for movement as one in either direction, a control member rotatable with the driven member for moving said interponents to inoperative position against the force of said resilient means to uncouple said members for independent rotation of the driving member; and means for positively stopping the control member to free the interponents from driving position and uncouple the driving and driven members.

5. A clutch having a driving member and a driven member, interponents floatingly carried between them, resilient means for moving said interponents to position to become wedged between the driving and driven members and couple them for movement as one, a control member rotatable with the driven member for moving said interponents to inoperative position against the force of said resilient means to uncouple said members for independent rotation of the driving member; means for positively stopping the control member to free the interponents from driving position and uncouple the driving and driven members; and means for limiting said relative movement between the control member and the driven means whereby said stopping means also acts through said control member to positively stop said driven member.

6. A clutch having a driving member and a driven member, interponents floatingly carried between them, resilient means for moving said interponents to position to become wedged between the driving and driven members and simultaneously couple them for movement as one in either direction, a control member rotatable with the driven member for moving said interponents to inoperative position against the force of said resilient means to uncouple said members for independent rotation of the driving member; and means for retarding the movement of the control member relative to the driven member to produce relative movement for rendering said interponents inoperative, to uncouple the driving and driven members.

7. A clutch having a driving member and a driven member, interponents floatingly carried between them, resilient means for moving said interponents to position to become wedged between the driving and driven members and couple them for movement as one, a control member rotatable with the driven member for moving said interponents to inoperative position against the force of said resilient means to uncouple said members for independent rotation of the driving member; a brake drum carried by the control member; and a brake band engageable with said brake drum for applying braking force to said control member to move it relative to said driven member and render the interponents inoperative and uncouple the driving and driven members.

8. A clutch having a driving member and a driven member, pairs of interponents floatingly carried between them, resilient means between the interponents of each pair for moving said interponents to position to become wedged between the driving and driven members and couple them for movement as one in either direction, a control member rotatable with the driven member for selectively moving one of the interponents of each pair to inoperative position against the force of said resilient means depending upon the direction of relative movement between the controller and the driving member to uncouple said members for independent rotation of the driving member; and means for retarding the movement of the control member relative to the driven member to produce relative movement for rendering said interponents inoperative and uncouple the driving and driven members regardless of the direction of rotation of the driving and driven members.

9. A clutch having a driving member and a driven member, pairs of interponents floatingly carried between them, resilient means between the interponents of each pair for moving said interponents to position to become wedged between the driving and driven members and couple them for movement as one in either direction, a control member rotatable with the driven member for selectively moving one of the interponents of each pair to inoperative position against the force of said resilient means depending upon the direction of relative movement between the controller and the driving member to uncouple said members for independent rotation of the driving member; and means for retarding the movement of the control member relative to the driven member to produce relative movement for rendering said interponents inoperative and uncouple the driving and driven members regardless of the direction of rotation of the driving and driven members, said resilient means being operative to cause said interponents to become operative to couple the driving member to the driven member for driving in either direction when the retarding means is disengaged from the control member.

10. A clutch having a driving member and a driven member, interponents floatingly carried between them, resilient means for moving said interponents to position to become wedged between the driving and driven members and couple them for movement as one, a control member rotatable with the driven member for moving said interponents to inoperative position against the force of said resilient means to uncouple said members for independent rotation of the driving member; and means for applying friction to the control member to retard the latter and cause relative movement between it and the driven member to render the interponents inoperative and uncouple the driving and driven members.

11. A clutch having a driving member and a driven member, interponents floatingly carried between them, resilient means for moving said interponents to position to become wedged between the driving and driven members and couple them for movement as one, a control member rotatable with the driven member for moving said interponents to inoperative position against the force of said resilient means to uncouple said members for independent rotation of the driving member; means for applying friction to the control member to retard the latter and cause relative movement between it and the driven member to render the interponents inoperative and uncouple the driving and driven members; and means for applying friction to the driven member through the control member whereby said first-named friction means also acts through said control member to stop said driven member.

12. A reversible drive clutch comprising a driving and a driven member, an opposed overrunning means selectively operative to drive the driven member in either direction, resilient means normally urging said overrunning means to operative position; and a control member rotating with the driven member; halting means for retarding free rotation of the control member, said control member moving the overrunning means to inoperative position when retarded against movement relative to the driven member by the halting means.

13. A reversible drive clutch comprising a driving and a driven member, an opposed overrunning means selectively operative to drive the driven member in either direction, resilient means normally urging said overrunning means to operative position; a control member rotating with the driven member for moving the overrunning means to inoperative position when retarded against movement relative to the driven member; and means acting through said control member for retarding movement of the driven member.

14. A reversible drive clutch comprising a driving and a driven member, an opposed overrunning means selectively operative to drive the driven member in either direction, resilient means normally urging said overrunning means to operative position; a control member rotating with the driven member for moving the overrunning means to inoperative position when movement of the control member is stopped; and lost-motion means for halting the rotation of the driven member after the control member has been stopped and has first moved the overrunning means to inoperative position.

15. A reversible drive clutch comprising a driving and a driven member, an opposed overrunning means selectively operative to drive the driven member in either direction, resilient means normally urging said overrunning means to operative position; a control member rotating with the driven member for moving the overrunning means to inoperative position when movement of the control member is stopped; and means acting through said control member for stopping movement of the driven member.

16. A reversible drive clutch comprising a driving and a driven member, an opposed overrunning means selectively operative to drive the driven member in either direction, resilient means normally urging said overrunning means to operative position; a control member rotating with the driven member for moving the overrunning means to inoperative position when retarded against movement relative to the driven member; and a brake device for retarding movement of the control member.

17. A reversible drive clutch comprising a driving and a driven member, an opposed overrunning means selectively operative to drive the driven member in either direction, resilient means normally urging said overrunning means to operative position; a control member rotating with the driven member for moving the overrunning means to inoperative position when movement of the control member is stopped, said control member having stopping lugs; and a stopping dog movable into position to engage said lugs and stop movement of the control member.

18. A clutch having a driving member and a driven member, interponents floatingly carried between them, resilient means for moving said interponents to position to become wedged between the driving and driven members and couple them for movement as one, a control member rotatable with the driven member for moving said interponents to inoperative position against the force of said resilient means to uncouple said members for independent rotation of the driving member; a brake drum carried by the control member; and a brake band engageable with said brake drum for applying braking force to said control member to move it relative to said driven member and render the interponents inoperative and uncouple the driving and driven members, said driven member being nested within the control member and the control member being nested within the brake drum.

LOUIS SPRARAGEN.